(12) United States Patent
Farsad (10) Patent No.: US 10,995,784 B2
(45) Date of Patent: May 4, 2021

(54) LATERAL LOCKING MECHAINSM FOR ATTACHING SHEET PIECES

(71) Applicant: A MAZING CONCEPTS, LLP, Goleta, CA (US)

(72) Inventor: Ali Farsad, Santa Barbara, CA (US)

(73) Assignee: AMAZING CONCEPTS, LLC, Goleta, CA (US)

( * ) Notice: Subject to any disclaimer, the term of this patent is extended or adjusted under 35 U.S.C. 154(b) by 807 days.

(21) Appl. No.: 15/845,811

(22) Filed: Dec. 18, 2017

(65) Prior Publication Data

US 2018/0216645 A1 Aug. 2, 2018

Related U.S. Application Data

(60) Provisional application No. 62/499,565, filed on Jan. 30, 2017.

(51) Int. Cl.
*F16B 5/07* (2006.01)

(52) U.S. Cl.
CPC ...................... *F16B 5/07* (2013.01)

(58) Field of Classification Search
CPC ................. F16B 5/07; Y10T 29/49833–49837
See application file for complete search history.

(56) References Cited

U.S. PATENT DOCUMENTS

| | | | | |
|---|---|---|---|---|
| 1,980,154 A | * | 11/1934 | Coe | F16B 5/06 403/283 |
| 2,268,339 A | * | 12/1941 | Leslie | B65D 63/04 24/20 EE |
| 3,462,805 A | * | 8/1969 | Sverre | A44B 19/08 24/586.11 |
| 3,728,779 A | * | 4/1973 | Behlen | F16B 5/07 29/432 |
| 3,877,280 A | * | 4/1975 | Cornell | B21D 31/02 29/243.519 |
| 3,968,624 A | * | 7/1976 | Allmendinger | F16B 5/02 403/363 |
| 4,986,691 A | * | 1/1991 | Hafner | B21D 39/03 29/521 |
| 5,678,946 A | * | 10/1997 | Enami | B21D 39/03 29/509 |
| 6,076,246 A | * | 6/2000 | McCooey | B29C 44/383 264/261 |
| 9,327,336 B2 | * | 5/2016 | Murakami | B21D 39/031 |

* cited by examiner

*Primary Examiner* — Daniel J Wiley
(74) *Attorney, Agent, or Firm* — Lyon & Harr, LLP; Richard T. Lyon (57) ABSTRACT

A locking mechanism is provided that attaches sheet pieces. The mechanism includes a sheet of material and various self-locking shapes that are cut therefrom, where this cutting forms an aperture in the sheet. Some of the self-locking shapes are releasably affixable to the aperture by removing them from the sheet, rotating them, and inserting the rotated shapes back into the aperture, where this releasable affixment results from a plurality of sides of the rotated shapes making contact with and laterally pushing against the aperture. One of the self-locking shapes is an ellipse which is releasably affixable to the aperture by rotating the ellipse while it is within and in planar alignment with the aperture until radially opposing sides of the ellipse make contact with and push against the aperture. A peripheral edge of another one of the self-locking shapes forms an ellipse and includes one or more flexible fingers.

20 Claims, 6 Drawing Sheets

LATERAL LOCKING MECHANISM FOR ATTACHING SHEET PIECES

CROSS REFERENCE TO RELATED APPLICATION

This application claims the benefit of and priority to provisional U.S. patent application Ser. No. 62/499,565 filed Jan. 30, 2017.

BACKGROUND

In manufacturing, various shapes are often cut from a planar sheet of material using a cutting tool. Regardless of the type of material that is being cut, or the shape that is being cut from the planar sheet of material, or the size of the shape, some cutting technologies eliminate a small portion of the material along the cutting line during the cutting process—examples of such cutting technologies include laser-based cutting tools, saws, and water-jet-based cutting tools. This material elimination creates a gap between the cut part (e.g., the cut shape) and the sheet of material resulting in the cut part being slightly smaller than the aperture that is formed in the sheet of material, which allows the cut part to be removed from the sheet of material.

SUMMARY

Locking mechanism implementations described herein generally involve a locking mechanism for attaching sheet pieces, where the locking mechanism includes a planar sheet of material and a self-locking shape that is cut from the sheet of material. In one exemplary implementation the cut shape has a horizontal axis of symmetry and a vertical axis of symmetry. The cutting of the self-locking shape from the sheet of material forms an aperture in the sheet of material. The aperture has a shape that is similar to the cut shape and a size that is slightly larger than the size of the cut shape. The cut shape is releasably affixable to the aperture by removing the cut shape from the sheet of material, rotating the cut shape from its original radial orientation, and inserting the rotated cut shape back into the aperture, where this releasable affixment results from a plurality of sides of the rotated cut shape making contact with and laterally pushing against the aperture.

In another exemplary implementation the cut shape is an ellipse. The cutting of the ellipse from the sheet of material creates a gap between the cut ellipse and the sheet of material and forms an aperture in the sheet of material. The gap allows the cut ellipse to be rotated while it is within the aperture. The aperture has a shape that is similar to the cut ellipse and a size that is slightly larger than the size of the cut ellipse. The cut ellipse is releasably affixable to the aperture by rotating the cut ellipse from its original radial orientation while it is within and in planar alignment with the aperture until radially opposing sides of the cut ellipse make contact with and push against the aperture.

In yet another exemplary implementation a peripheral edge of the cut shape forms an ellipse and includes one or more flexible fingers. The cutting of the self-locking shape from the sheet of material creates a gap between the peripheral edge of the cut shape and the sheet of material and forms an aperture in the sheet of material. The gap allows the cut shape to be rotated while it is within the aperture. The aperture has a shape that is similar to the ellipse formed by the peripheral edge of the cut shape and a size that is slightly larger than the size of this ellipse. The cut shape is releasably affixable to the aperture by rotating the cut shape from its original radial orientation while it is within and in planar alignment with the aperture until an outermost edge of each of the flexible fingers makes contact with and pushes against the aperture.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more-detailed description that is presented below.

DESCRIPTION OF THE DRAWINGS

The specific features, aspects, and advantages of the locking mechanism implementations described herein will become better understood with regard to the following description, appended claims, and accompanying drawings where:

DETAILED DESCRIPTION

In the following description of locking mechanism implementations reference is made to the accompanying drawings which form a part hereof, and in which are shown, by way of illustration, specific implementations in which the locking mechanism can be realized. It is understood that other implementations can be utilized and structural changes can be made without departing from the scope of the locking mechanism implementations.

It is also noted that for the sake of clarity specific terminology will be resorted to in describing the locking mechanism implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version", or "one variant", or "another variant", or an "exemplary variant", or an "alternate variant" means that a particular feature, a particular structure, or particular characteristics described in connection with the implementation/version/variant can be included in at least one implementation of the locking mechanism. The appearances of the phrases "in one implementation", "in another implementation", "in an exemplary implementation", "in an alternate implementation", "in one version", "in another version", "in an exemplary version", "in an alternate version", "in one variant", "in another variant", "in an exemplary variant", and "in an alternate variant" in various places in the specification are not necessarily all referring to the same implementation/version/variant, nor are separate or alternative implementations/versions/variants mutually exclusive of other implementations/versions/variants. Yet furthermore, the order of method flow representing one or more implementations, or versions, or variants of the locking mechanism does not inherently indicate any particular order nor imply any limitations of the locking mechanism.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Lateral Locking Mechanism for Attaching Sheet Pieces

As described heretofore, in manufacturing, various shapes are often cut from a planar sheet of material using a cutting tool. Regardless of the type of material that is being cut, or the shape that is being cut from the planar sheet of material, or the size of the shape, some cutting technologies eliminate a small portion of the material along the cutting line during the cutting process—examples of such cutting technologies include laser-based cutting tools, saws, and water-jet-based cutting tools. This material elimination creates a gap between the cut part (e.g., the cut shape) and the sheet of material resulting in the cut part being slightly smaller than the aperture that is formed in the sheet of material, which allows the cut part to be removed from the sheet of material.

Figure 1:
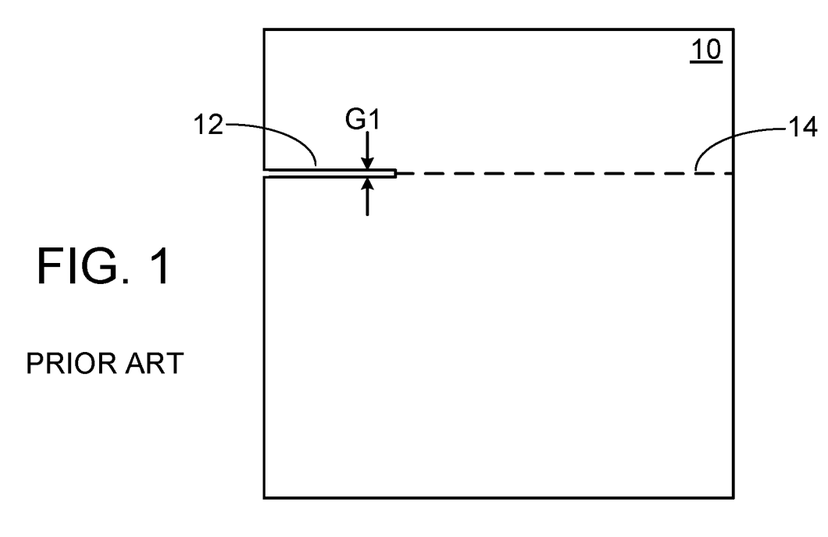
FIG. 1 is a diagram illustrating a plan view, in simplified form, of a planar sheet of material that is being cut along a cutting line.

FIG. 1 illustrates a plan view, in simplified form, of a planar sheet of material 10 that is being cut 12 along a cutting line 14 using a cutting tool (not shown). As exemplified in FIG. 1, a small portion of the material 10 is eliminated along the cutting line 14 as the cut 12 is being made. In other words, the cutting tool creates a gap G1 along the cutting line 14 as the cut 12 is being made. It will be appreciated that the size of this gap G1 generally depends on the type of cutting tool that is being used to make the cut 12, and small variations in the size of the gap G1 may occur as the cut 12 progresses along the cutting line 14.

Figure 2:
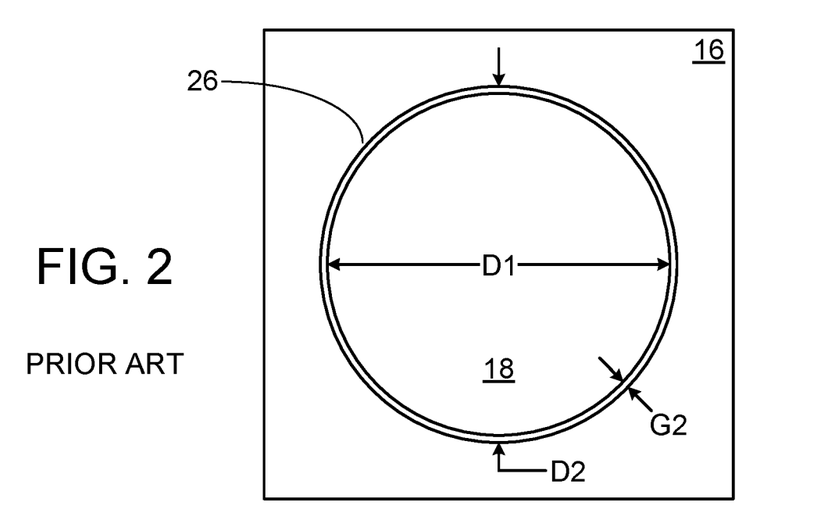
FIG. 2 is a diagram illustrating a plan view, in simplified form, of a planar sheet of material from which a circular shape is cut.

FIG. 2 illustrates a plan view, in simplified form, of a planar sheet of material 16 from which a circular shape 18 is cut using a cutting tool (not shown). As exemplified in FIG. 2, the process of cutting the circular shape 18 from the sheet of material 16 eliminates a small portion of the material 16 along the cutting line that forms the shape 18. In other words, the cutting tool creates a gap G2 between the cut circular shape 18 and the sheet of material 16. This gap G2 allows the cut circular shape 18 to be readily removed from the sheet of material 16. This removal of the cut circular shape 18 forms an aperture 26 in the sheet of material 16, where this aperture 26 has a shape that is similar to (e.g., substantially the same as) the shape 18, and the diameter D1 of the shape 18 is slightly smaller than the diameter D2 of the aperture 26 (e.g., the size of the aperture 26 is slightly larger than the size of the shape 18). However, although the cut circular shape 18 can be readily inserted back into the aperture 26, it will be appreciated that due to the just-described material removal the shape 18 cannot be affixed (e.g., reattached) to the aperture 26 without using an adhesive or extra part(s) (such as a hinge or other type of joint mechanism), which will involve extra manufacturing step(s) and an associated cost increase.

The locking mechanism implementations described herein generally involve using a prescribed cutting tool to cut a prescribed self-locking shape from a planar sheet of prescribed material. The term "self-locking shape" is used herein to refer to a particular type of shape that is cut from the sheet of material, where the characteristics of the cut shape (e.g., the cut part) allow it to be affixed to the aforementioned aperture in the sheet of material formed by the cutting without using an adhesive or extra part(s). As will be described in more detail hereafter, the locking mechanism technique implementations support the cutting of a variety of different self-locking shapes having a variety of different sizes from a variety of different conventional materials using a variety of different conventional cutting tools. The aperture that is formed in a given planar sheet of material when a given self-locking shape is cut from the sheet of material is hereafter sometimes simply referred to as the aperture. As described heretofore, the aperture has a shape that is similar to the cut self-locking shape (or in the case of one particular self-locking shape that is described hereafter, the aperture has a shape that is similar to the shape formed by the peripheral edge of the cut self-locking shape). The aperture also has a size that is slightly larger than the size of the cut self-locking shape. As will be appreciated from the more-detailed description that follows, most of the self-locking shapes described herein have two different axes of symmetry, namely a horizontal axis of symmetry and a vertical axis of symmetry. Additionally, certain ones of the self-locking shapes described herein are structured such that they can be readily and releasably affixed (e.g., releasably secured or "locked") to the aperture simply by inserting them back into the aperture and then rotating them (e.g., changing their radial orientation from their original radial orientation).

Other ones of the self-locking shapes described herein are structured such that they can be readily and releasably affixed to the aperture simply by rotating them a prescribed amount and then inserting them back into the aperture. As will also be appreciated from the more-detailed description that follows, the releasable affixment (e.g., reattachment) of each of the self-locking shapes described herein is enhanced when the planar sheet of material has a larger thickness. In other words, the strength of the releasable affixment of each of the self-locking shapes described herein increases as the thickness of the planar sheet of material is increased.

The locking mechanism implementations described herein generally support the use of any type of material that is durable, is slightly flexible and compressible (e.g., has a slight level of elasticity), is resilient, and is available in the form of a planar sheet. Examples of such a material include, but are not limited to, PVC (polyvinyl chloride), or fiberglass, or other types of plastic, or carbon fiber, or rubber, or wood, or plywood, or various types of metal, or various types of composite material, or the like. It is noted that the level of flexibility and compressibility (e.g., the level of elasticity) of the material does not need to be high. In fact, a small amount of elasticity is sufficient for most applications of the locking mechanism implementations.

The locking mechanism implementations described herein also support the use of various types of cutting tools including, but not limited to, a laser cutting machine, or a computer numerical control (CNC) machine of various types, or a band saw, among other types of cutting tools. It is noted that particular types of cutting tools are ideally suited to cutting particular types of materials. As such, the type of cutting tool that is used in a given implementation of the locking mechanism described herein is generally selected based on the type of material that is being cut.

The locking mechanism implementations described herein are advantageous for various reasons including, but not limited to, the following. As will be appreciated from the foregoing and the more-detailed description that follows, the locking mechanism implementations decrease the number of manufacturing steps and the costs associated with many different manufacturing applications. For example, once a desired one of the aforementioned self-locking shapes has been cut from a sheet of a desired one of the aforementioned materials, the cut self-locking shape can be readily and releasably affixed to the aperture in the sheet of material, where this affixment is accomplished simply by either inserting the cut self-locking shape back into the aperture and then rotating the cut self-locking shape, or rotating the cut self-locking shape a prescribed amount and then inserting it back into the aperture. No adhesive, or extra part(s), or extra manufacturing step(s) is need to accomplish the affixment. The affixed cut self-locking shape can be readily removed from the aperture in the sheet of material whenever desired simply by rotating the affixed shape in a reverse direction, or applying a pushing or pulling force to the planar surface of the affixed shape. In addition, the just-described affixment of the cut self-locking shape to, and removal of the affixed cut self-locking shape from, the aperture in the sheet of material can be performed repeatedly.

Various exemplary implementations of the locking mechanism will now be described in more detail.

Figure 3:
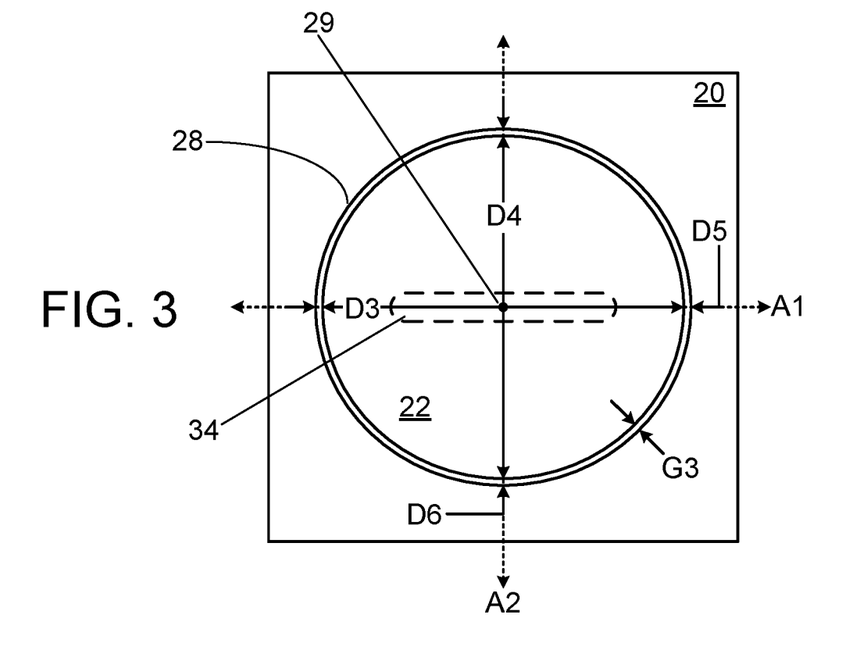
FIG. 3 is a diagram illustrating a plan view, in simplified form, of a planar sheet of material from which one implementation of a self-locking shape is cut.

FIG. 3 illustrates a plan view, in simplified form, of a planar sheet of material 20 from which one implementation of a self-locking shape 22 is cut using a cutting tool (not shown). As exemplified in FIG. 3, the self-locking shape 22 is an ellipse whose major axis A1 diameter D3 is larger than its minor axis A2 diameter D4. The point 29 depicts the center of the self-locking shape 22. The axis A1 is a horizontal axis of symmetry for the self-locking shape 22, and the axis A2 is vertical axis of symmetry for this shape 22. The process of cutting the self-locking shape 22 from the sheet of material 20 eliminates a small portion of the material 20 along the cutting line that forms the shape 22. In other words, the cutting tool creates a gap G3 between the cut shape 22 and the sheet of material 20. This gap G3 allows the cut shape 22 to be readily removed from the sheet of material 20. This removal of the cut shape 22 forms an aperture 28 in the sheet of material 20, where this aperture 28 has a shape that is similar to the cut shape 22, the diameter D5 of the major axis A1 of the aperture 28 is slightly larger than the diameter D3, and the diameter D6 of the minor axis A2 of the aperture 28 is slightly larger than the diameter D4 (e.g., the size of the aperture 28 is slightly larger than the size of the cut shape 22). The gap G3 also allows the cut shape 22 to be partially rotated while it is within the aperture 28.

Figure 4:
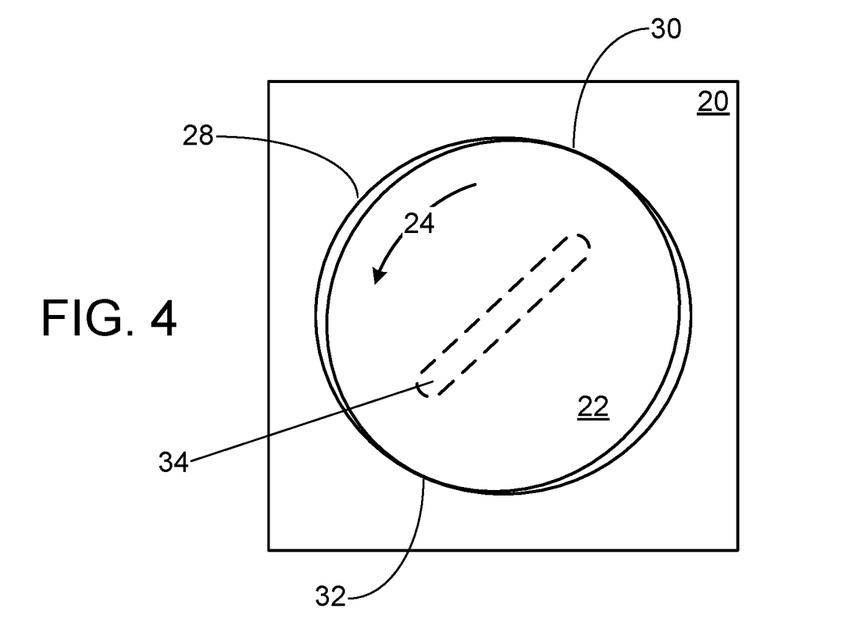
FIG. 4 is a diagram illustrating a plan view, in simplified form, of the planar sheet of material and the cut self-locking shape of FIG. 3 after this cut shape has been rotated counterclockwise.

FIG. 4 illustrates a plan view, in simplified form, of the planar sheet of material 20 and the cut self-locking shape 22 of FIG. 3 after the cut shape 22 has been rotated 24 counterclockwise within the aperture 28 from the original radial orientation of the cut shape 22 shown in FIG. 3. In other words, the cut shape 22 can be readily removed from the aperture 28, and can then be readily and releasably affixed to the aperture 28 as follows. The cut shape 22 can be inserted into the aperture 28 in a radial orientation that is similar to its original radial orientation shown in FIG. 3. The cut shape 22 can then be rotated 24 while it is in planar alignment with the aperture 28 until radially opposing sides of the cut shape 22 make contact 30/32 with the aperture 28 as shown in FIG. 4, where this contact 30/32 serves to secure the cut shape 22 to the aperture 28. In other words, the rotation 24 of the cut shape 22 within the aperture 28 will cause the radially opposing sides of the cut shape 22 to "meet" and push against the aperture 28 in two places 30/32 which can be thought of as "connection points" between the cut shape 22 and the aperture 28. It is noted that the more rotation 24 force that is applied to the cut shape 22, the more the radially opposing sides will push against the aperture 28 and thus, the more securely the cut shape 22 will be releasably affixed to the aperture 28. It is also noted that the aforementioned flexible and compressible nature of the material 20 serves to enhance this affixment. It is also noted that depending on how flexible and compressible the material 20 is there is a maximum amount of rotation 24 (e.g., approximately 90 degrees from the original radial orientation shown in FIG. 3) after which the cut shape 22 may begin to release/detach from the aperture 28—as such, the amount of rotation 24 used to affix the cut shape 22 to the aperture 28 should not exceed this maximum amount. It is also noted that rather than rotating 24 the cut shape 22 while it is within the aperture 28 as described heretofore, the cut shape 22 may also be releasably affixed to the aperture 28 by removing the cut shape 22 from the sheet of material 20, then rotating the cut shape 22 up to approximately 90 degrees from its original radial orientation, and then inserting the rotated cut shape back into the aperture 28. It is also noted that the affixed cut shape 22 can be readily removed from the aperture 28 whenever desired simply by rotating the cut shape 22 in a clockwise direction, or by applying a small amount of pushing or pulling force to the planar surface of the affixed cut shape 22.

Referring again to FIGS. 3 and 4, it is also noted that, rather than rotating the cut shape 22 in the counterclockwise direction 24 to affix it to the aperture 28 as just described, the cut shape 22 shown in FIG. 3 can also be readily and releasably affixed to the aperture 28 by rotating the cut shape 22 in a clockwise direction (not shown)—in this case the affixed cut shape 22 can be readily removed from the aperture 28 whenever desired simply by rotating the cut shape 22 in a counterclockwise direction. It is also noted that the curved edge of the cut shape 22 and its corresponding aperture 28 advantageously allow for small variations in the size of the gap G3 that may occur during the cutting process depending on the particular type of cutting tool that is used. In other words, the cut shape 22 can still be readily and releasably affixed to the aperture 28 even if there are small variations in the size of the gap G3 between the cut shape 22 and the aperture 28. It is also noted that the cut shape 22 may optionally include a slot 34 that is centrally formed on the surface of the cut shape 22, where this slot 34 may be employed by a user to rotate the cut shape 22.

Figure 5:
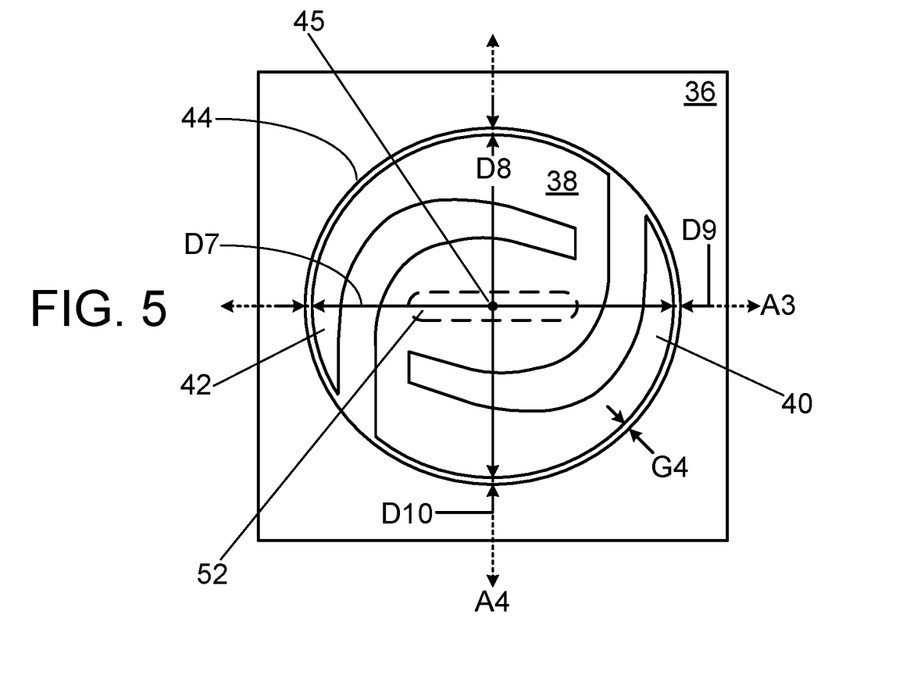
FIG. 5 is a diagram illustrating a plan view, in simplified form, of a planar sheet of material from which another implementation of a self-locking shape is cut.

FIG. 5 illustrates a plan view, in simplified form, of a planar sheet of material 36 from which another implementation of a self-locking shape 38 is cut using a cutting tool (not shown), where this shape 38 is a variant of the self-locking shape 22 shown in FIGS. 3 and 4. As exemplified in FIG. 5, the peripheral edge of the self-locking shape 38 forms an ellipse whose major axis A3 diameter D7 is larger than its minor axis A4 diameter D8. In this respect the self-locking shape 38 is similar to the self-locking shape 22 that is shown in FIGS. 3 and 4. However, the self-locking shape 38 differs from the self-locking shape 22 in that the peripheral edge of the self-locking shape 38 includes of a pair of flexible fingers 40/42. The point 45 depicts the center of the self-locking shape 38. The process of cutting the self-locking shape 38 from the sheet of material 36 eliminates a small portion of the material 36 along the cutting line that forms the shape 38. In other words, the cutting tool creates a gap G4 between the peripheral edge of the cut shape 38 and the sheet of material 36. This gap G4 allows the cut shape 38 to be readily removed from the sheet of material 36. This removal of the cut shape 38 forms an aperture 44 in the sheet of material 36, where this aperture 44 has a shape that is similar to the ellipse that is formed by the peripheral edge of the cut shape 38, the diameter D9 of the major axis A3 of the aperture 44 is slightly larger than the diameter D7, and the diameter D10 of the minor axis A4 of the aperture 44 is slightly larger than the diameter D8 (e.g., the size of the aperture 44 is slightly larger than the size of this ellipse). The gap G4 also allows the cut shape 38 to be partially rotated while it is within the aperture 44.

Figure 6:
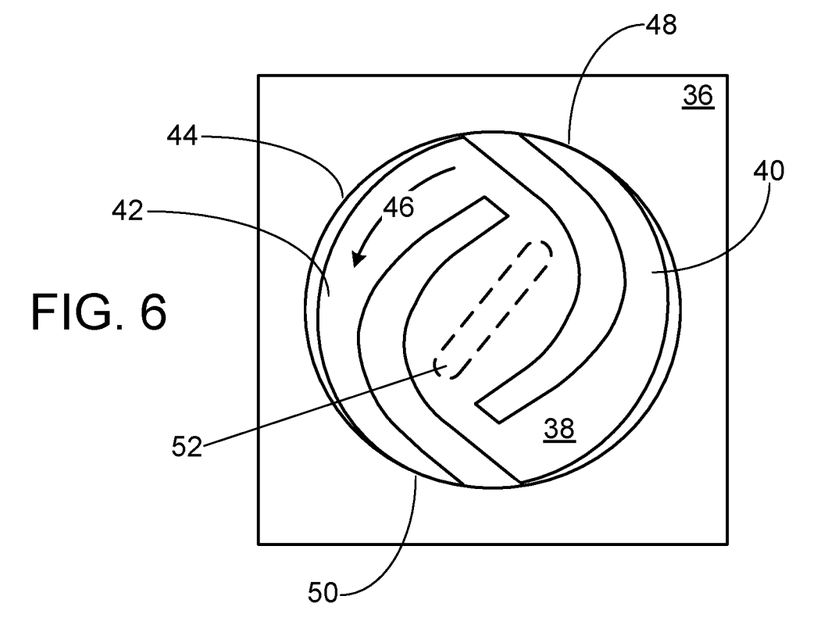
FIG. 6 is a diagram illustrating a plan view, in simplified form, of the planar sheet of material and the cut self-locking shape of FIG. 5 after this cut shape has been rotated counterclockwise.

FIG. 6 illustrates a plan view, in simplified form, of the planar sheet of material 36 and the cut self-locking shape 38 of FIG. 5 after the cut shape 38 has been rotated 46 counterclockwise within the aperture 44 from the original radial orientation of the cut shape 38 shown in FIG. 5. In other words, the cut shape 38 can be readily removed from the aperture 44, and can then be readily and releasably affixed to the aperture 44 as follows. The cut shape 38 can be inserted into the aperture 44 in a radial orientation that is similar to its original radial orientation shown in FIG. 5. The cut shape 38 can then be rotated 46 while it is in planar alignment with the aperture 44 until the outermost edge of each of the cut shape's 38 flexible fingers 40/42 makes contact 48/50 with the aperture 44 as shown in FIG. 6, where this contact 48/50 serves to secure the cut shape 38 to the aperture 44. In other words, the rotation 46 of the cut shape 38 within the aperture 44 will cause the outermost edge of each of the cut shape's 38 flexible fingers 40/42 to "meet" and push against the aperture 44 in two places 48/50 which can be thought of as "connection points" between the cut shape 38 and the aperture 44. It is noted that the more rotation 46 force that is applied to the cut shape 38, the more the outermost edge of each of the cut shape's 38 flexible fingers 40/42 will push against the aperture 44 and thus, the more securely the cut shape 38 will be releasably affixed to the aperture 44—as such, the flexible fingers 40/42 operate like a spring mechanism. It is also noted that the aforementioned flexible and compressible nature of the material 36 serves to enhance this affixment. It is also noted that depending on how flexible and compressible the material 36 is there is a maximum amount of rotation 46 (e.g., approximately 90 degrees from the original radial orientation shown in FIG. 5) after which the cut shape's 38 flexible fingers 40/42 may begin to release/detach from the aperture 44—as such, the amount of rotation 46 used to affix the cut shape 38 to the aperture 44 should not exceed this maximum amount. It is also noted that rather than rotating 46 the cut shape 38 while it is within the aperture 44 as described heretofore, the cut shape 38 may also be releasably affixed to the aperture 44 by removing the cut shape 38 from the sheet of material 36, then rotating the cut shape 38 up to approximately 90 degrees from its original radial orientation, and then inserting the rotated cut shape back into the aperture 44. It is also noted that the affixed cut shape 38 can be readily removed from the aperture 44 whenever desired simply by rotating the cut shape 38 in a clockwise direction, or by applying a small amount of pushing or pulling force to the planar surface of the affixed cut shape 38.

Referring again to FIGS. 3-6, it is also noted that, rather than rotating the cut shape 38 in the counterclockwise direction 46 to affix it to the aperture 44 as just described, the cut shape 38 shown in FIG. 5 can also be readily and releasably affixed to the aperture 44 by rotating the cut shape 38 in a clockwise direction (not shown)—in this case the affixed cut shape 38 can be readily removed from the aperture 44 whenever desired simply by rotating the cut shape 38 in a counterclockwise direction. It is also noted that the curved nature of the outermost edge of each of the cut shape's 38 flexible fingers 40/42 and the corresponding curved edge of the aperture 44 advantageously allows for small variations in the size of the gap G4 that may occur during the cutting process depending on the particular type of cutting tool that is used. In other words, the cut shape 38 can still be readily and releasably affixed to the aperture 44 even if there are small variations in the size of the gap G4 between the cut shape 38 and the aperture 44. In fact, it will be appreciated that the cut shape 38 is even more tolerant to variations in the size of the gap G4 than the cut shape 22 shown in FIGS. 3 and 4. It is also noted that the cut shape 38 may optionally include a slot 52 that is centrally formed on the surface of the cut shape 38, where this slot 52 may be employed by a user to rotate the cut shape 38.

It is further noted that although the self-locking shape 38 shown in FIGS. 5 and 6 includes a pair of flexible fingers 40/42, other versions of the self-locking shape 38 (not shown) are also possible which have either a single flexible finger, or three or more flexible fingers.

Figure 7:
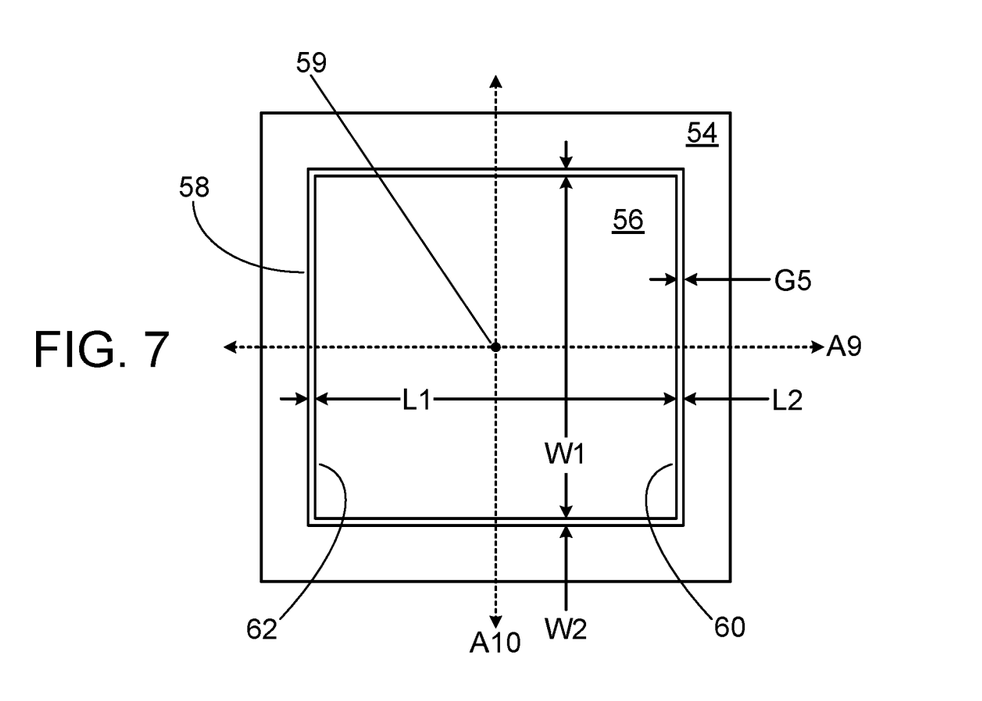
FIG. 7 is a diagram illustrating a plan view, in simplified form, of a planar sheet of material from which another implementation of a self-locking shape is cut.

FIG. 7 illustrates a plan view, in simplified form, of a planar sheet of material 54 from which another implementation of a self-locking shape 56 is cut using a cutting tool (not shown). As exemplified in FIG. 7, the self-locking shape 56 is a rectangle whose length L1 is larger than its width W1. The self-locking shape 56 has two different axes of symmetry, namely a horizontal axis of symmetry A9 and a vertical axis of symmetry A10. Point 59 depicts the center of the self-locking shape 56. The process of cutting the self-locking shape 56 from the sheet of material 54 eliminates a small portion of the material 54 along the cutting line that forms the shape 56. In other words, the cutting tool creates a gap G5 between the edge of the cut shape 56 and the sheet of material 54. This gap G5 allows the cut shape 56 to be readily removed from the sheet of material 54. This removal of the cut shape 56 forms an aperture 58 in the sheet of material 54, where this aperture 58 has a shape that is similar to the cut shape 56, the length L2 of the aperture 58 is slightly larger than the length L1, and the width W2 of the aperture 58 is slightly larger than the width W1 (e.g., the size of the aperture 58 is slightly larger than the size of the cut shape 56). It is noted that the value of length L1 is selected to be slightly larger than the value of width W1 plus the value of the size of the gap G5 (or an average of the different values of the size of the gap G5 between the cut shape 56 and the aperture 58 in the case where small variations in this size occur during the cutting process). In other words, the difference between the value of length L1 and the value of width W1 is chosen so as to allow the cut shape 56 to have a jam fit in the aperture 58 when the cut shape 56 is rotated from its original radial orientation and inserted back into the aperture 58 as will be described in more detail hereafter. It will be appreciated that this difference between length L1 and width W1 also depends on how flexible and compressible the material 54 is.

Figure 8:
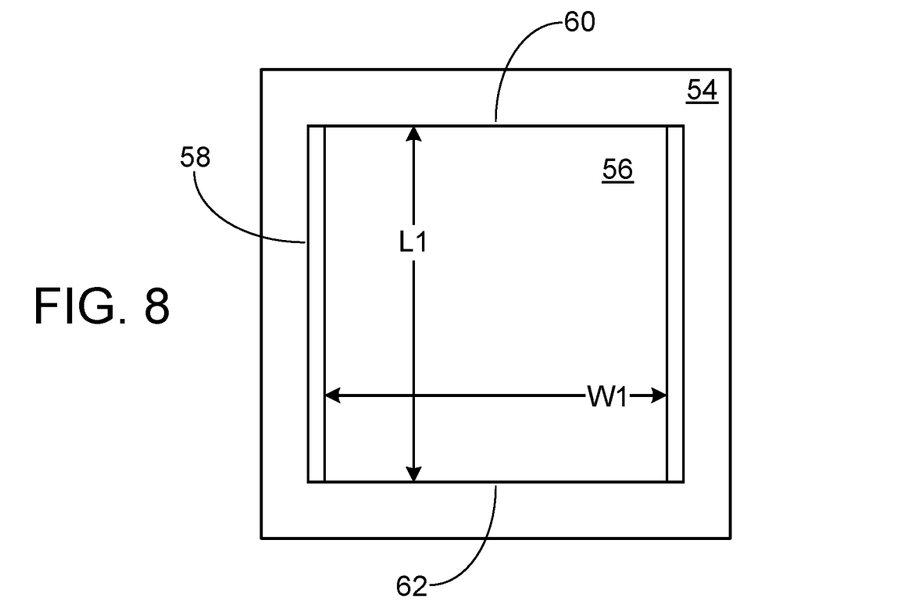
FIG. 8 is a diagram illustrating a plan view, in simplified form, of the planar sheet of material and the cut self-locking shape of FIG. 7 after this cut shape has been removed from the sheet of material, then rotated approximately 90 degrees, and then inserted back into an aperture in the sheet of material that is formed by the removal of the cut shape.

FIG. 8 illustrates a plan view, in simplified form, of the planar sheet of material 54 and the cut self-locking shape 56 of FIG. 7 after the cut shape 56 has been removed from the sheet of material 54, then rotated approximately 90 degrees from the original radial orientation of the cut shape 56 shown in FIG. 7, and then inserted back into the aperture 58. In other words, the cut shape 56 can be readily removed from the aperture 58, and can then be readily and releasably affixed to the aperture 58 as follows. After the cut shape 56 has been removed, it can be rotated approximately 90 degrees from its original radial orientation shown in FIG. 7. The rotated cut shape 56 can then be inserted back into the aperture 58 as shown in FIG. 8. Since the value of length L1 is selected to be slightly larger than the value of width W1 plus the value of the size of the gap G5 as described heretofore, two sides 60/62 of the cut shape 56 that are parallel to the vertical axis of symmetry A10 will make contact with the aperture 58 as shown in FIG. 8, where this contact serves to secure the cut shape 56 to the aperture 28. In other words, the insertion of the rotated cut shape 56 back into the aperture 58 will cause the two sides 60/62 of the cut shape 56 to "meet" and push against (e.g., form a jam fit with) the top and bottom sides of the aperture 58, resulting in the cut shape 56 being releasably affixed to the aperture 58. It is also noted that the aforementioned flexible and compressible nature of the material 54 serves to enhance this affixment. It is also noted that the affixed rotated cut shape 56 can be readily removed from the aperture 58 whenever desired simply by applying a small amount of pushing or pulling force to the planar surface of the affixed rotated cut shape 56.

Figure 9:
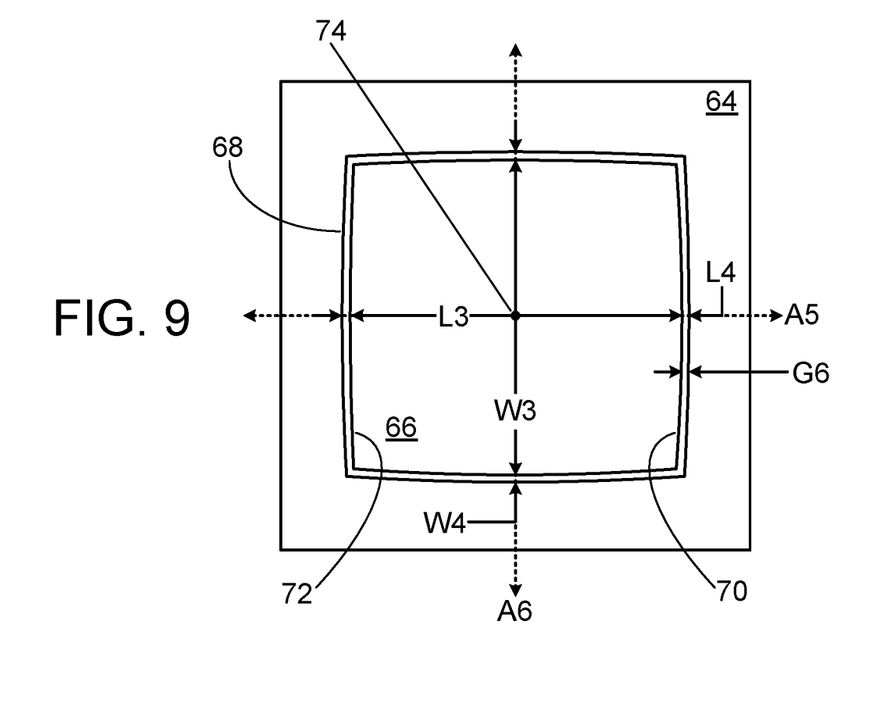
FIG. 9 is a diagram illustrating a plan view, in simplified form, of a planar sheet of material from which another implementation of a self-locking shape is cut.

FIG. 9 illustrates a plan view, in simplified form, of a planar sheet of material 64 from which another implementation of a self-locking shape 66 is cut using a cutting tool (not shown). As exemplified in FIG. 9, the self-locking shape 66 is a rectangle whose four sides are each curved slightly outward from the center 74 of the shape 66. The self-locking shape 66 has two different axes of symmetry, namely a horizontal axis of symmetry A5 and a vertical axis of symmetry A6. The length L3 of the shape 66 measured along the axis A5 is larger than the width W3 of the shape 66 measured along the axis A6. The process of cutting the self-locking shape 66 from the sheet of material 64 eliminates a small portion of the material 64 along the cutting line that forms the shape 66. In other words, the cutting tool creates a gap G6 between the edge of the cut shape 66 and the sheet of material 64. This gap G6 allows the cut shape 66 to be readily removed from the sheet of material 64. This removal of the cut shape 66 forms an aperture 68 in the sheet of material 64, where this aperture 68 has a shape that is similar to the cut shape 66, the length L4 of the aperture 68 measured along the just-described horizontal axis A5 is slightly larger than the length L3, and the width W4 of the aperture 68 measured along the just-described vertical axis A6 is slightly larger than the width W3 (e.g., the size of the aperture 68 is slightly larger than the size of the cut shape 66). It is noted that the value of length L3 is selected to be slightly larger than the value of width W3 plus the value of the size of the gap G6 (or an average of the different values of the size of the gap G6 between the cut shape 66 and the aperture 68 in the case where small variations in this size occur during the cutting process). In other words, the difference between the value of length L3 and the value of width W3 is chosen so as to allow the cut shape 66 to have a jam fit in the aperture 68 when the cut shape 66 is rotated from its original radial orientation and inserted back into the aperture 68 as will be described in more detail hereafter. It will be appreciated that this difference between length L3 and width W3 also depends on how flexible and compressible the material 64 is.

Figure 10:
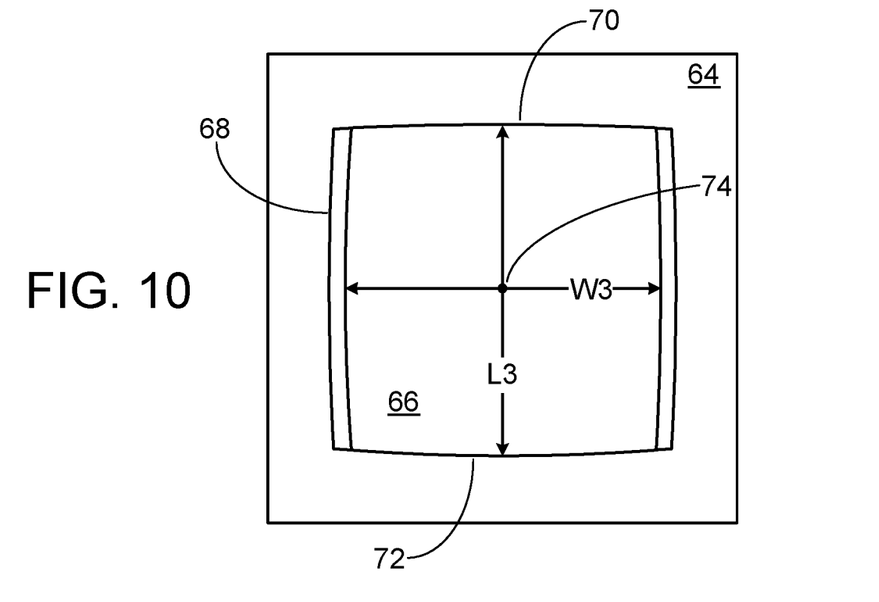
FIG. 10 is a diagram illustrating a plan view, in simplified form, of the planar sheet of material and the cut self-locking shape of FIG. 9 after this cut shape has been removed from the sheet of material, then rotated approximately 90 degrees, and then inserted back into an aperture in the sheet of material that is formed by the removal of the cut shape.

FIG. 10 illustrates a plan view, in simplified form, of the planar sheet of material 64 and the cut self-locking shape 66 of FIG. 9 after the cut shape 66 has been removed from the sheet of material 64, then rotated approximately 90 degrees from the original radial orientation of the cut shape 66 shown in FIG. 9, and then inserted back into the aperture 68. In other words, the cut shape 66 can be readily removed from the aperture 68, and can then be readily and releasably affixed to the aperture 68 as follows. After the cut shape 66 has been removed, it can be rotated approximately 90 degrees from its original radial orientation shown in FIG. 9. The rotated cut shape 66 can then be inserted back into the aperture 68 as shown in FIG. 10. Since the value of length L3 is selected to be slightly larger than the value of width W3 plus the value of the size of the gap G6 as described heretofore, two sides 70/72 of the cut shape 66 that are parallel to the vertical axis of symmetry A6 will make contact with the aperture 68 as shown in FIG. 10, where this contact serves to secure the cut shape 66 to the aperture 68. In other words, the insertion of the rotated cut shape 66 back into the aperture 68 will cause the two sides 70/72 of the cut shape 66 to "meet" and push against (e.g., form a jam fit with) the top and bottom sides of the aperture 68, resulting in the cut shape 66 being releasably affixed to the aperture 68. It is also noted that the aforementioned flexible and compressible nature of the material 64 serves to enhance this affixment. It is also noted that the affixed rotated cut shape 66 can be readily removed from the aperture 68 whenever desired simply by applying a small amount of pushing or pulling force to the planar surface of affixed rotated cut shape 66. It is also noted that the curved sides of the cut shape 66 and its corresponding aperture 68 advantageously allow for small variations in the size of the gap G6 that may occur during the cutting process depending on the particular type of cutting tool that is used. In other words, the cut shape 66 can still be readily and releasably affixed to the aperture 68 even if there are small variations in the size of the gap G6 between the cut shape 66 and the aperture 68.

Figure 11:
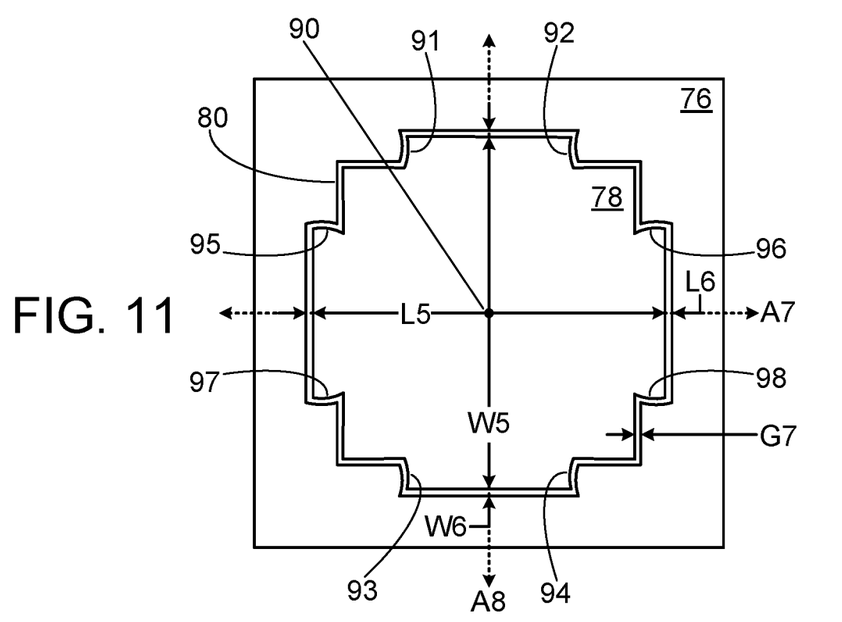
FIG. 11 is a diagram illustrating a plan view, in simplified form, of a planar sheet of material from which another implementation of a self-locking shape is cut.

FIG. 11 illustrates a plan view, in simplified form, of a planar sheet of material 76 from which another implementation of a self-locking shape 78 is cut using a cutting tool (not shown). As exemplified in FIG. 11, the self-locking shape 78 is a 20-cornered, 20-sided shape that has two different axes of symmetry, namely a horizontal axis of symmetry A7 and a vertical axis of symmetry A8, where the four sides 91-94 of the shape 78 that are parallel to and nearest the axis A8 are curved slightly inward toward the axis A8, and the four sides 95-98 of the shape 78 that are parallel to and nearest the axis A7 are curved slightly outward away from the axis A7. Point 90 depicts the center of the self-locking shape 78. The length L5 of the cut self-locking shape 78 measured along the axis A7 is substantially equal to the width W5 of the shape 78 measured along the axis A8. The process of cutting the self-locking shape 78 from the sheet of material 76 eliminates a small portion of the material 76 along the cutting line that forms the shape 78. In other words, the cutting tool creates a gap G7 between the edge of the cut shape 78 and the sheet of material 76. This gap G7 allows the cut shape 78 to be readily removed from the sheet of material 76. This removal of the cut shape 78 forms an aperture 80 in the sheet of material 76, where this aperture 80 has a shape that is similar to the cut shape 78, the length L6 of the aperture 80 measured along the axis A7 is slightly larger than the length L5, and the width W6 of the aperture 80 measured along the axis A8 is slightly larger than the width W5 (e.g., the size of the aperture 80 is slightly larger than the size of the cut shape 78).

Figure 12:
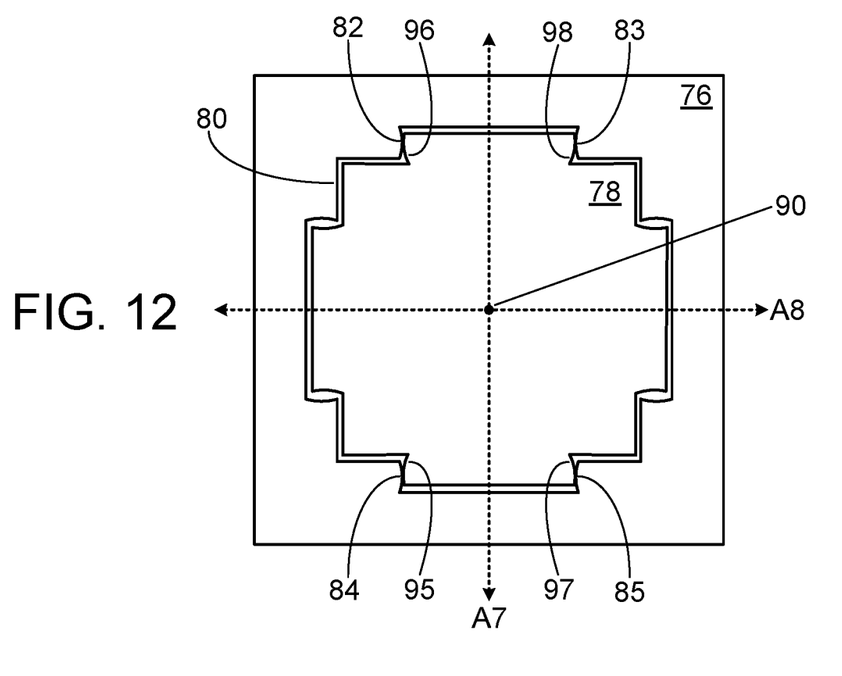
FIG. 12 is a diagram illustrating a plan view, in simplified form, of the planar sheet of material and the cut self-locking shape of FIG. 11 after this cut shape has been removed from the sheet of material, then rotated approximately 90 degrees, and then inserted back into an aperture in the sheet of material that is formed by the removal of the cut shape.

FIG. 12 illustrates a plan view, in simplified form, of the planar sheet of material 76 and the cut self-locking shape 78 of FIG. 11 after the cut shape 78 has been removed from the sheet of material 76, then rotated approximately 90 degrees from the original radial orientation of the cut shape 78 shown in FIG. 11, and then inserted back into the aperture 80. In other words, the cut shape 78 can be readily removed from the aperture 80, and can then be readily and releasably affixed to the aperture 80 as follows. After the cut shape 78 has been removed, it can be rotated approximately 90 degrees from its original radial orientation shown in FIG. 11. The rotated cut shape 78 can then be inserted back into the aperture 80 as shown in FIG. 12, where this insertion results in the outwardly curved four sides 95-98 of the rotated cut shape 78 making contact 82-85 with the aperture 80 as shown in FIG. 12, where this contact 82-85 serves to secure the cut shape 78 to the aperture 80. In other words, the insertion of the rotated cut shape 78 back into the aperture 80 will cause the outwardly curved four sides 95-98 of the rotated cut shape 78 to "meet" and push against (e.g., form a jam fit with) the aperture 80 at the contact points 82-85, resulting in the cut shape 78 being releasably affixed to the aperture 80. It is noted that the aforementioned flexible and compressible nature of the material 76 serves to enhance this affixment. It is also noted that the affixed rotated cut shape 78 can be readily removed from the aperture 80 whenever desired simply by applying a small amount of pushing or pulling force to the planar surface of affixed rotated cut shape 78. It is also noted that the curved sides 91-98 of the cut shape 78 and its corresponding aperture 80 advantageously allow for small variations in the size of the gap G7 that may occur during the cutting process depending on the particular type of cutting tool that is used. In other words, the cut shape 78 can still be readily and releasably affixed to the aperture 80 even if there are small variations in the size of the gap G7 between the cut shape 78 and the aperture 80.

2.0 Other Implementations

While the locking mechanism has been described by specific reference to implementations thereof, it is understood that variations and modifications thereof can be made without departing from the true spirit and scope of the locking mechanism. By way of example but not limitation, the cut shape that is releasably affixed to the aperture which is formed by the gap created by the cutting of a first self-locking shape from a first sheet of material using a given cutting tool does not necessarily have to be the cut first self-locking shape itself. Rather, an alternate implementation of the locking mechanism described herein is possible where the cut shape that is releasably affixed to the aperture in the first sheet of material is a second self-locking shape which is cut from a second sheet of material using either the same or a similar cutting tool, where the second self-locking shape is similar to the first self-locking shape, and the second sheet of material is similar to the first sheet of material. In other words the just-described cut first and second self-locking shapes are interchangeable such that the cut first self-locking shape can be releasably affixed to the aperture in the second sheet of material, and the cut second self-locking shape can be releasably affixed to the aperture in the first sheet of material. Another alternate implementation of the locking mechanism is also possible where the material of the just-described first sheet is different than the material of the just-described second sheet. Another alternate implementation of the locking mechanism is also possible where the cut shape that is releasably affixed to the aperture in the first sheet of material is a third shape that is manufactured from the same material as the first sheet using a method other than cutting, where this third shape is similar to the first self-locking shape. Another alternate implementation of the locking mechanism is also possible where the material from which the just-described third shape is manufactured is different than the material of the first sheet.

It is noted that any or all of the implementations that are described in the present document and any or all of the implementations that are illustrated in the accompanying drawings may be used and thus claimed in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

The aforementioned implementations have been described with respect to interaction between several components. It will be appreciated that such implementations and components can include those components or specified sub-components, some of the specified components or sub-components, and/or additional components, and according to various permutations and combinations of the foregoing. Sub-components can also be implemented as components coupled to other components rather than included within parent components (e.g., hierarchical components).

Wherefore, what is claimed is:

1. A locking mechanism for attaching sheet pieces, comprising:
  a planar sheet of material; and
  a self-locking shape that is cut from the sheet of material,
  the cut shape having a horizontal axis of symmetry and a vertical axis of symmetry,
  said cutting forming an aperture in the sheet of material,
  the aperture having a shape that is similar to the cut shape and a size that is slightly larger than a size of the cut shape,
  the cut shape being releasably affixable to the aperture by removing the cut shape from the sheet of material, rotating the cut shape approximately 90 degrees from its original radial orientation, and inserting the rotated cut shape back into the aperture, said releasable affixment resulting from a plurality of sides of the rotated cut shape making contact with and laterally pushing against the aperture.

2. The locking mechanism of claim 1, wherein,
  said cutting creates a gap between the cut shape and the sheet of material,
  the self-locking shape comprises a rectangle having a length and a width,
  the length is slightly larger than the width plus a size of the gap, and
  said releasable affixment results from two of the sides of the cut shape that are parallel to the vertical axis of symmetry making contact with and pushing against the aperture.

3. The locking mechanism of claim 2, wherein the difference between the length and the width is chosen so as to allow the cut shape to have a jam fit in the aperture when the rotated cut shape is inserted back into the aperture.

4. The locking mechanism of claim 3, wherein the difference between the length and the width is chosen so as to allow the cut shape to have a jam fit in the aperture when the rotated cut shape is inserted back into the aperture.

5. The locking mechanism of claim 1, wherein,
  said cutting creates a gap between the cut shape and the sheet of material,
  the self-locking shape comprises a rectangle whose four sides are each curved slightly outward from its center,
  the rectangle has a length measured along the horizontal axis of symmetry and a width measured along the vertical axis of symmetry,
  the length is slightly larger than the width plus a size of the gap, and
  said releasable affixment results from two of the sides of the cut shape that are parallel to the vertical axis of symmetry making contact with and pushing against the aperture.

6. The locking mechanism of claim 1, wherein,
  said cutting creates a gap between the cut shape and the sheet of material,
  the self-locking shape comprises a 20-cornered, 20-sided shape,
  four of said 20 sides that are parallel to and nearest the vertical axis of symmetry are curved slightly inward toward the vertical axis of symmetry,
  another four of said 20 sides that are parallel to and nearest the horizontal axis of symmetry are curved slightly outward away from the horizontal axis of symmetry,
  the 20-cornered, 20-sided shape has a length measured along the horizontal axis of symmetry and a width measured along the vertical axis of symmetry,
  the length is equal to the width, and
  said releasable affixment results from the four sides of the cut shape that are curved slightly outward away from the horizontal axis of symmetry making contact with and pushing against the aperture.

7. The locking mechanism of claim 1, wherein the material comprises one of:
  PVC (polyvinyl chloride); or
  fiberglass; or
  another type of plastic; or
  carbon fiber; or
  rubber; or
  wood; or
  plywood; or
  a metal; or
  a composite material that is flexible, compressible, and resilient.

8. The locking mechanism of claim 1, wherein said releasable affixment has a strength that increases as a thickness of the planar sheet of material is increased.

9. A locking mechanism for attaching sheet pieces, comprising:
  a planar sheet of material; and
  an ellipse that is cut from the sheet of material,
  said cutting creating a gap between the cut ellipse and the sheet of material and forming an aperture in the sheet of material,
  the gap allowing the cut ellipse to be rotated while it is within the aperture,
  the aperture having a shape that is similar to the cut ellipse and a size that is slightly larger than a size of the cut ellipse,
  the cut ellipse being releasably affixable to the aperture by rotating the cut ellipse from its original radial orientation while it is within and in planar alignment with the aperture until radially opposing sides of the cut ellipse make contact with and push against the aperture.

10. The locking mechanism of claim 9, wherein the cut ellipse is also releasably affixable to the aperture by removing the cut ellipse from the sheet of material, rotating the cut ellipse up to approximately 90 degrees from its original radial orientation, and inserting the rotated cut ellipse back into the aperture.

11. The locking mechanism of claim 9, wherein said rotation is in one of:
  a counterclockwise direction; or
  a clockwise direction.

12. The locking mechanism of claim 9, wherein the material comprises one of:
  PVC (polyvinyl chloride); or
  fiberglass; or
  another type of plastic; or
  carbon fiber; or
  rubber; or
  wood; or
  plywood; or
  a metal; or
  a composite material that is flexible, compressible, and resilient.

13. The locking mechanism of claim 9, wherein said releasable affixment has a strength that increases as a thickness of the planar sheet of material is increased.

14. The locking mechanism of claim 9, wherein the cut ellipse comprises a slot that is centrally formed on a surface of the cut ellipse for use in rotating the cut ellipse.

15. A locking mechanism for attaching sheet pieces, comprising:

a planar sheet of material; and a self-locking shape that is cut from the sheet of material, a peripheral edge of the cut shape forming an ellipse and comprising one or more flexible fingers, said cutting creating a gap between the peripheral edge of the cut shape and the sheet of material and forming an aperture in the sheet of material, the gap allowing the cut shape to be rotated while it is within the aperture, the aperture having a shape that is similar to the ellipse formed by the peripheral edge of the cut shape and a size that is slightly larger than a size of said ellipse, the cut shape being releasably affixable to the aperture by rotating the cut shape from its original radial orientation while it is within and in planar alignment with the aperture until an outermost edge of each of the flexible fingers makes contact with and pushes against the aperture.

16. The locking mechanism of claim 15, wherein the cut shape is also releasably affixable to the aperture by removing the cut shape from the sheet of material, rotating the cut shape up to approximately 90 degrees from its original radial orientation, and inserting the rotated cut shape back into the aperture.

17. The locking mechanism of claim 15, wherein said rotation is in one of:
 a counterclockwise direction; or
 a clockwise direction.

18. The locking mechanism of claim 15, wherein the material comprises one of:
 PVC (polyvinyl chloride); or
 fiberglass; or
 another type of plastic; or
 carbon fiber; or
 rubber; or
 wood; or
 plywood; or
 a metal; or
 a composite material that is flexible, compressible, and resilient.

19. The locking mechanism of claim 15, wherein said releasable affixment has a strength that increases as a thickness of the planar sheet of material is increased.

20. The locking mechanism of claim 15, wherein the cut shape comprises a slot that is centrally formed on a surface of the cut shape for use in rotating the cut shape.

* * * * *

UNITED STATES PATENT AND TRADEMARK OFFICE
CERTIFICATE OF CORRECTION

PATENT NO. : 10,995,784 B2
APPLICATION NO. : 15/845811
DATED : May 4, 2021
INVENTOR(S) : Ali Farsad Page 1 of 1

It is certified that error appears in the above-identified patent and that said Letters Patent is hereby corrected as shown below:

In the Claims

Column 13, Line 35, "3" should be changed to --5--.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*